US008962186B2

(12) United States Patent
Wang et al.

(10) Patent No.: US 8,962,186 B2
(45) Date of Patent: Feb. 24, 2015

(54) LITHIUM ION PHOSPHATE HIERARCHICAL STRUCTURE, METHOD FOR MAKING THE SAME, AND LITHIUM ION BATTERY USING THE SAME

(75) Inventors: Li Wang, Beijing (CN); Xiang-Ming He, Beijing (CN); Wen-Ting Sun, Beijing (CN); Jian-Jun Li, Beijing (CN); Xian-Kun Huang, Beijing (CN); Jian Gao, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 92 days.

(21) Appl. No.: 13/457,554

(22) Filed: Apr. 27, 2012

(65) Prior Publication Data

US 2013/0136989 A1    May 30, 2013

(30) Foreign Application Priority Data

Nov. 24, 2011    (CN) .......................... 2011 1 0377966

(51) Int. Cl.
*H01M 4/525*    (2010.01)
*H01M 4/58*    (2010.01)
*C01B 25/45*    (2006.01)

(52) U.S. Cl.
CPC ............. *H01M 4/5825* (2013.01); *C01B 25/45* (2013.01); *Y10S 977/755* (2013.01)
USPC .......................... 429/221; 252/182.1; 977/755

(58) Field of Classification Search
CPC ............................ C01B 25/45; H01M 4/5825
USPC .......................... 429/221; 977/755; 252/182.1
See application file for complete search history.

(56) References Cited

U.S. PATENT DOCUMENTS

2012/0112132 A1* 5/2012 Smith et al. ................... 252/500
2012/0292560 A1* 11/2012 Tahara et al. .............. 252/182.1

FOREIGN PATENT DOCUMENTS

| CN | 101786405 A | * | 7/2010 |
| CN | 102074687 | | 5/2011 |
| CN | 102110814 | | 6/2011 |

OTHER PUBLICATIONS

"Monodisperse Porous LiFePO4 Microspheres for a High Power Li-Ion Battery Cathode". Chunwen Sun, Shreyas Rajasekhara, John B. Goodenough, and Feng Zhou. Journal of the American Chemical Society. Jan. 2011. 133 (7), 2132-2135.*
"On the growth mechanism and optical properties of ZnO multi-layer nanosheets". H.J. Fan, R. Scholz, F.M. Kolb, M. Zacharias, U. Gösele, F. Heyroth, C. Eisenschmidt, T. Hempel, J. Christen. Applied Physics A. Dec. 2004. 79 (8), 1895-1900.*
CN 101783405 A—English Translation (Google).*

* cited by examiner

*Primary Examiner* — Milton I Cano
*Assistant Examiner* — Anne R Dixon
(74) *Attorney, Agent, or Firm* — Novak Druce Connolly Bove + Quigg LLP

(57) ABSTRACT

A lithium iron phosphate hierarchical structure includes a plurality of lithium iron phosphate nano sheets and has an overall spherical-shaped structure. The overall spherical-shaped structure is constructed by a plurality of lithium iron phosphate nano sheets layered together. A method for making a lithium iron phosphate hierarchical structure includes several steps. In the method, a lithium ion contained liquid solution, a ferrous ion contained liquid solution, and a phosphate ion contained liquid solution are respectively provided. A concentration of lithium ions in the lithium ion contained liquid solution is equal to or larger than 1.8 mol/L. The lithium ion contained liquid solution, the ferrous ion contained liquid solution, and the phosphate ion contained liquid solution are mixed to form a liquid mixture. The liquid mixture is heated in a sealed reactor to form the lithium iron phosphate hierarchical structure.

12 Claims, 25 Drawing Sheets

US 8,962,186 B2

LITHIUM ION PHOSPHATE HIERARCHICAL STRUCTURE, METHOD FOR MAKING THE SAME, AND LITHIUM ION BATTERY USING THE SAME

CROSS-REFERENCE TO RELATED APPLICATIONS

This application claims all benefits accruing under 35 U.S.C. §119 from China Patent Application No. 201110377966.3, filed on Nov. 24, 2011, in the China Intellectual Property Office, the contents of which are hereby incorporated by reference.

BACKGROUND

1. Technical Field

The present disclosure relates to lithium iron phosphates, methods for making the same, and rechargeable lithium ion batteries using the same. The present disclosure particularly relates to a lithium iron phosphate hierarchical structure, a method for making the same, and a rechargeable lithium ion battery using the same.

2. Description of Related Art

Olivine type lithium iron phosphate (e.g. $LiFePO_4$), is an attractive cathode active material. Lithium iron phosphate has advantages of high safety, low cost, and environmental friendliness. However, lithium iron phosphate has deficiencies such as a low electronic conductivity and a slow diffusion of lithium ions. Efforts on improving the electronic conductivity of lithium iron phosphate have been made by carbon coating the lithium iron phosphate particle surface, and doping the lithium iron phosphate with metal ions. In the aspect of improving the diffusion of lithium ions, particle size minimization of the lithium iron phosphate has been undertaken to decrease a diffusion path of the lithium ions. Hydrothermal method and solvothermal method are two common methods for preparing nano sized lithium iron phosphate.

However, disadvantages will occur when the particle of the lithium iron phosphate is nano in size. For example, a tap density of the nano sized particles is lower than micron sized particles. The smaller the particle size of the lithium iron phosphate, the more binder and conductive agent will be required during the preparing of the cathode electrode of the lithium ion battery. The increased content of the binder and conductive agent will decrease a capacity per volume of the lithium ion battery. Furthermore, the nano-sized particles have a large specific surface area, and are difficult to process during the preparation of an electrode slurry and coating the electrode slurry on a cathode current collector to form a uniform cathode electrode.

What is needed, therefore, is to provide a lithium iron phosphate hierarchical structure which can avoid the above described disadvantages of the nano sized lithium iron phosphate particles. A relatively simple method for making the same, and a lithium ion battery using the same are also provided.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
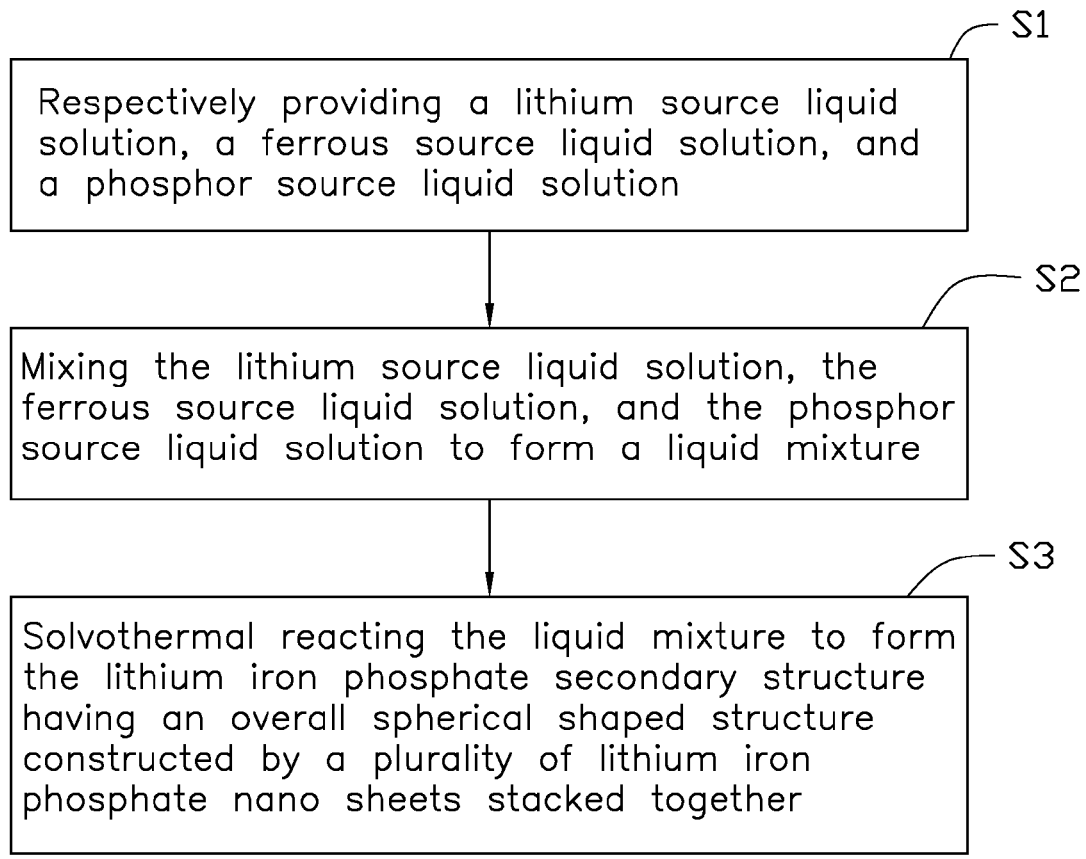
FIG. 1 is flowchart of one embodiment of a method for making a lithium iron phosphate hierarchical structure.

Referring to FIG. 1, one embodiment of a method for making a lithium iron phosphate hierarchical structure including steps of:

S1, respectively providing a lithium ion contained liquid solution, a ferrous ion contained liquid solution, and a phosphate ion contained liquid solution;

S2, mixing the lithium ion contained liquid solution, the ferrous ion contained liquid solution, and the phosphate ion contained liquid solution to form a liquid mixture; and S3, heating the liquid mixture in a sealed reactor to form the lithium iron phosphate hierarchical structure having an overall spherical-shaped structure constructed by a plurality of lithium iron phosphate nano sheets layered together.

In the step S1, the lithium ion contained liquid solution can be formed by dissolving a lithium chemical compound in an organic solvent. A concentration of lithium ions in the lithium ion contained liquid solution can be equal to or larger than 1.8 mol/L. The ferrous ion contained liquid solution can be formed by dissolving an ferrous chemical compound in an organic solvent. The phosphate ion contained liquid solution can be formed by dissolving phosphor chemical compound or phosphate chemical compound in an organic solvent. The lithium chemical compound, the ferrous chemical compound, and the phosphor chemical compound are capable of dissolving in the organic solvent respectively. The lithium chemical compound can be selected from but not limited to lithium hydroxide (LiOH), lithium chloride (LiCl), lithium sulfate ($Li_2SO_4$), lithium nitrate ($LiNO_3$), lithium dihydrogen phosphate ($LiH_2PO_4$), lithium acetate ($CH_3COOLi$), and combinations thereof. The ferrous chemical compound can be selected from but not limited to ferrous sulfate ($FeSO_4$), ferrous acetate ($Fe(CH_3COO)_2$), ferrous chloride ($FeCl_2$), and combinations thereof. The phosphor chemical compound can be selected from but no limited to phosphoric acid ($H_3PO_4$), $LiH_2PO_4$, triammonium phosphate ($NH_3PO_4$), monoammonium phosphate ($NH_4H_2PO_4$), dioammonium phosphate ($(NH_4)_2HPO_4$), and combinations thereof.

The organic solvent is capable of dissolving the lithium chemical compound, the ferrous chemical compound, and the phosphor chemical compound, and can be diols and/or polyols, such as ethylene glycol, glycerol, diethylene glycol, triethylene glycol, tetraethylene glycol, 1,2,4-butanetriol, and combinations thereof. The material of the organic solvent can be selected according to the material of the lithium chemical compound, the ferrous chemical compound, and the phosphor chemical compound.

In one embodiment, the solvent of the lithium ion contained liquid solution, the ferrous ion contained liquid solution, and the phosphate ion contained liquid solution only include the organic solvent. In another embodiment, the solvent of the lithium ion contained liquid solution, the ferrous ion contained liquid solution, and the phosphate ion contained liquid solution not only include the organic solvent but also include a small quantity of water accompanying with the organic solvent. In some embodiments, the lithium chemical compound and the ferrous chemical compound may have a crystal water, such as $LiOH.H_2O$, $C_2H_3LiO_2.2H_2O$ and $FeSO_4.7H_2O$. When dissolving the lithium chemical compound and the ferrous chemical compound into the organic solvent, the crystal water in the lithium chemical compound and the ferrous chemical compound can dissolve to introduce water in the solution. However, a volume ratio between the water and the organic solvent should be smaller than or equal to 1:10, to avoid affecting the shape and structure of the final product of the lithium iron phosphate hierarchical structure. In one embodiment, the volume ratio is smaller than 1:50.

The concentration of the lithium ions in the lithium ion contained liquid solution can be equal to or larger than 1.8 mol/L. In one embodiment, the concentration of the lithium ion in the lithium ion contained liquid solution is in a range from about 2 mol/L to about 6 mol/L. The organic solvent may have a small solubility to some lithium chemical compound, therefore, when the lithium ions has a concentration equal to or above 1.8 mol/L, the lithium chemical compound can be near or reach a saturation state in the lithium ion contained liquid solution. Therefore, when mixing the lithium ion contained liquid solution with the ferrous ion contained liquid solution, or with the phosphate ion contained liquid solution, the concentration of the lithium ion in the organic solvent can be maintained at a relatively high level.

In the step S2, the lithium ion contained liquid solution, the ferrous ion contained liquid solution, and the phosphate ion contained liquid solution are mixed in a molar ratio of Li:Fe:P=(2~3):1:(0.8~1.5). That is, the liquid mixture contains 1 part element Fe, 2~3 parts element Li, and 0.8~1.5 parts element P. The volume ratio between the water and the organic solvent in the liquid mixture is equal to or smaller than 1:10, for example, smaller than 1:50. The theoretical molar ratio of the chemical reaction among the lithium ion contained liquid solution, the ferrous ion contained liquid solution, and the phosphate ion contained liquid solution is Li:Fe:P=3:1:1. However, the lithium ion contained liquid solution can have an excess amount, and the percentage of the phosphate ion contained liquid solution can be relatively above or below the theoretical percentage.

In one embodiment, the ferrous ion contained liquid solution and the phosphate ion contained liquid solution can be previously mixed to form a first solution, and then the lithium ion contained liquid solution can be mixed with the first solution, to form a second solution. In another embodiment, the lithium ion contained liquid solution and the ferrous ion contained liquid solution can be previously mixed to form a third solution, and then the phosphate ion contained liquid solution can be mixed with the third solution to form a fourth solution.

During the mixing of the lithium ion contained liquid solution, the ferrous ion contained liquid solution, and the phosphate ion contained liquid solution, the concentration of the lithium ions should be equal to or larger than 1.8 mol/L, that is in a relatively high concentration level. Accordingly, during the mixing of the lithium ion contained liquid solution and the first solution to form the second solution, or during the mixing of the lithium ion contained liquid solution and the ferrous ion contained liquid solution to form the third solution, the concentration of the lithium ions of the used lithium ion contained liquid solution should be equal to or larger than 1.8 mol/L. The concentration of the lithium ions of the used lithium ion contained liquid solution is measured before the lithium ion contained liquid solution is mixed with the ferrous ion contained liquid solution and the phosphate ion contained liquid solution.

In the step S3, the liquid mixture can have a solvothermal reaction in a solvothermal reactor, such as a sealed autoclave. A pressure can be applied to the solvothermal reactor to increase a pressure inside the solvothermal reactor. In another embodiment, the solvothermal reactor can be heated, and a vapor of the solvent in the solvothermal reactor can be generated to increase the pressure inside the solvothermal reactor. The liquid mixture performs a solvothermal reaction at the elevated temperature and the elevated pressure to form the lithium iron phosphate hierarchical structure. The pressure inside the solvothermal reactor can be in a range from about 0.1 MPa to about 30 MPa. The temperature inside the solvothermal reactor can be in a range from about 150° C. to about 250° C. The reacting time can be in a range from about 1 hour to about 24 hours. After the solvothermal reaction, the solvothermal reactor can be naturally cooled to room temperature.

During the mixing step of the step S2, an additional chemical compound containing a doping element can be mixed with the lithium ion contained liquid solution, the ferrous ion contained liquid solution, and the phosphate ion contained liquid solution in a doping ratio, to finally achieve a doped lithium iron phosphate hierarchical structure. The doping element can be selected from chemical elements of alkali metal elements, alkaline-earth metal elements, Group-13 elements, Group-14 elements, transition metal elements, and rare-earth elements. In one embodiment, the doping element can be at least one of copper (Cu), manganese (Mn), nickel (Ni), chromium (Cr), cobalt (Co), vanadium (V), titanium (Ti), aluminum (Al), Zinc (Zn), gallium (Ga), neodymium (Nd), and magnesium (Mg).

After the step S3, the product can be taken from the solvothermal reactor, then washed and dried. The product can be washed, filtered, and centrifugalized by deionized water several times. Then the product can be dried by suction filtration or heating.

Furthermore, after the step S3, the product can be sintered in a protective gas at a sintering temperature. The sintering temperature can be in a range from about 400° C. to about 800° C. The sintering time can be in a range from about 2 hours to about 12 hours. The protective gas can be at least one of inert gas, nitrogen gas ($N_2$), or hydrogen gas ($H_2$). In one embodiment, the product is sintered in a mixture gas having about 5% of $H_2$ and about 95% of $N_2$. The sintering step is helpful to increase the crystallinity degree, and thus improve the performance of the lithium ion battery.

Furthermore, the lithium iron phosphate hierarchical structure can be coated by carbon. The carbon coating process can include steps of:

preparing a liquid solution of carbon source chemical compound;

adding the lithium iron phosphate hierarchical structure into the liquid solution of carbon source chemical compound to form a mixture; and heating the mixture.

The carbon source chemical compound can be a reductive organic chemical compound. The reductive organic chemical compound can be pyrolyzed in an oxygen free condition to form simple carbon (e.g., amorphous carbon) The pyrolysis step does not generate other solid phase substance. The carbon source chemical compound can be selected from saccharose, dextrose, span 80, epoxide resin, phenolic resin, furan resin, polyacrylic acid, polyacrylonitrile, polyethylene glycol, polyvinyl alcohol, and combinations thereof. In one embodiment, the carbon source chemical compound is saccharose. A concentration of the carbon source chemical compound in the carbon source chemical compound liquid solution can be in a range from about 0.005 g/ml to about 0.05 g/ml. After adding the lithium iron phosphate hierarchical structure into the liquid solution of carbon source chemical compound, the mixture can be stirred to fully infiltrate the carbon source chemical compound into clearances between two adjacent lithium iron phosphate nano sheets of the lithium iron phosphate hierarchical structure. The mixture can be evacuated in a container to completely evacuate air in the clearances between two adjacent lithium iron phosphate nano sheets. Before heating the mixture, the excess liquid solution of carbon source chemical compound can be removed and the mixture can be dried. A heating temperature of the mixture can be in a range from about 300° C. to about 800° C.), and a heating time of the mixture can be in a range from about 0.5 hours to about 3 hours. The heating step can be processed together with the sintering step as one step.

The method for making the lithium iron phosphate hierarchical structure does not need any spray drying step. The spherical-shaped hierarchical structure can be directly achieved by controlling the concentration of the lithium ion during the mixing step for the solvothermal reaction.

The above described method can synthesize a lithium iron phosphate material having a hierarchical structure. The lithium iron phosphate hierarchical structure has a spherical shape or similar spherical shape. The spherical-shaped or similar spherical-shaped hierarchical structure is constructed by a plurality of lithium iron phosphate nano sheets stacked together. The method adopts a solvothermal reaction in an organic solvent and controls the lithium ions at a high concentration level, to directly synthesize the hierarchical structure constructed by the plurality of lithium iron phosphate nano sheets stacked together. A large amount of the spherical-shaped or similar spherical-shaped lithium iron phosphate hierarchical structures can be directly synthesized at the same time. The spherical-shaped or similar spherical-shaped lithium iron phosphate hierarchical structures can have a uniform diameter, without extremely large spheres or extremely small spheres. During the solvothermal reaction, the liquid mixture does not need to include any surfactant. The spherical-shaped or similar spherical-shaped lithium iron phosphate hierarchical structures can be formed by simply controlling the concentration of the lithium ions during the mixing step.

A material of the lithium iron phosphate hierarchical structure is doped or undoped lithium iron phosphate, represented by a chemical formula of $Li_xFe_{1-y}M_yPO_4$, wherein $0.1 \leq x \leq 1.1$, and $0 \leq y \leq 0.9$. M represents at least one of the chemical elements of alkali metal elements, alkaline-earth metal elements, Group-13 elements, Group-14 elements, transition metal elements, and rare-earth elements. In one embodiment, M represents at least one of the chemical elements of Cu, Mn, Cr, Co, V, Ti, Al, Zn, Ni, Ga, and Mg.

The lithium iron phosphate hierarchical structure has an overall spherical shape and includes a plurality of layered lithium iron phosphate nano sheets. The lithium iron phosphate nano sheets are the primary structures. The plurality of layered lithium iron phosphate nano sheets together construct the spherical-shaped hierarchical structure.

Figure 14:
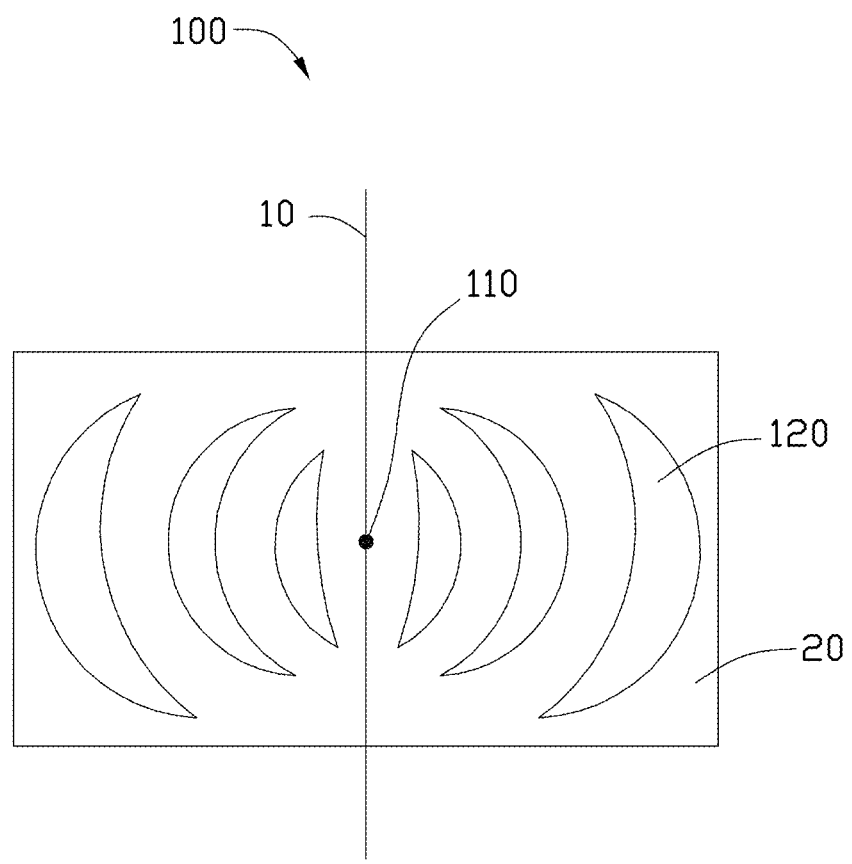
FIG. 14 is a schematic top view of the lithium iron phosphate hierarchical structure shown in FIG. 8B.
Figure 15:
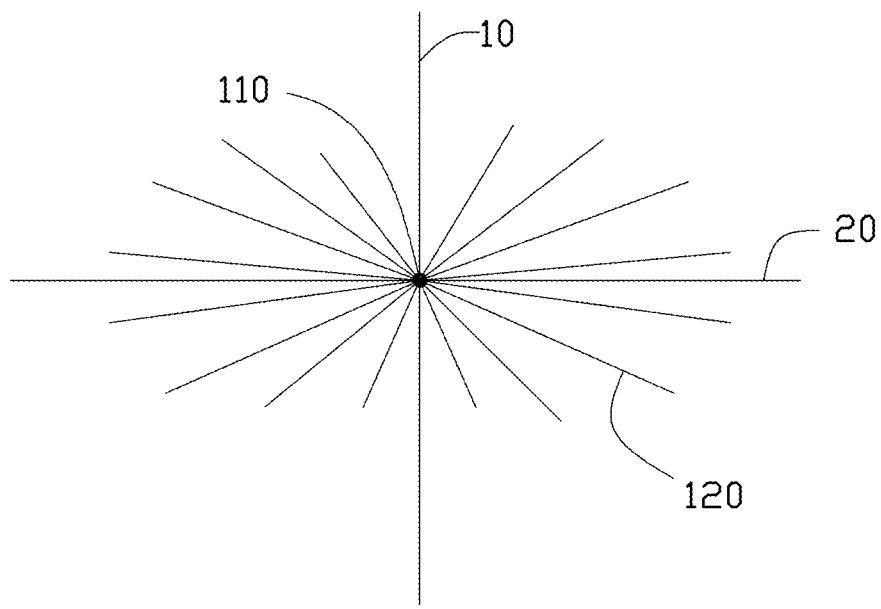
FIG. 15 is a schematic side view of the lithium iron phosphate hierarchical structure shown in FIG. 8B.

The lithium iron phosphate hierarchical structure has a plurality of clearances between the lithium iron phosphate nano sheets extend from the outer surface of the spherical-shaped hierarchical structure to the inner. Therefore, the lithium iron phosphate hierarchical structure is a porous material. The overall spherical shape of the lithium iron phosphate hierarchical structure can be a regular spherical shape or a similar spherical shape. Examples of similar spherical shapes are an ellipsoidal shape, an oblate spheroidal shape, a shape of spherical segment, or a shape of blood platelet. The lithium iron phosphate nano sheets are thin sheets having a nano-sized thickness. The extending direction of the lithium iron phosphate nano sheets is along a direction from the outer surface to the centre of the spherical-shaped lithium iron phosphate hierarchical structure. The outer ends of the plurality of lithium iron phosphate nano sheets cooperatively construct the spherical-shaped outline of the hierarchical structure. In one embodiment, the lithium iron phosphate nano sheets can extend from the outer surface of the spherical-shaped hierarchical structure to the sphere centre. The plurality of the lithium iron phosphate nano sheets are layered together and radially aligned around the sphere centre of the spherical-shaped hierarchical structure. Referring to FIG. 14 and FIG. 15, in one embodiment, a first plane 10 and a second plane 20 both pass through the sphere centre 110 can be defined in the spherical-shaped hierarchical structure 100. The second plane 20 is perpendicular to the first plane 10. The plurality of the lithium iron phosphate nano sheets 120 can be divided into at least two groups, respectively located at two sides of the first plane 10. The lithium iron phosphate nano sheets 120 in each group can be radially aligned from the sphere centre 110 to the outline of the hierarchical structure 100, and radially layered from the second plane 20 to the first plane 10. When the two groups of the lithium iron phosphate nano sheets 120 both radially layered to reach the first plane 10, the two groups of the lithium iron phosphate nano sheets 120 forms a complete spherical-shaped hierarchical structure 100. Further, the plurality of the lithium iron phosphate nano sheets 120 can be divided into three groups, and the third group can include at least one the lithium iron phosphate nano sheet 120 located in the first plane 10. It is to be understood that, affected by the reacting conditions such as reacting time or temperature, the two groups of the lithium iron phosphate nano sheets 120 may not be layered to form the complete spherical shape. The two groups of the lithium iron phosphate nano sheets 120 may not be layered to reach the first plane 10, therefore, the similar spherical-shaped hierarchical structure 100, such as the ellipsoidal shape, the oblate spheroidal shape, the shape of spherical segment, or the shape of blood platelet, can be formed.

In the lithium iron phosphate hierarchical structure, the lithium iron phosphate nano sheets can has a round shape, a circular sector shape, or a crescent shape. A central angle of the circular sector shaped lithium iron phosphate nano sheets can be larger than 90°. A clearance can be defined by two adjacent lithium iron phosphate nano sheets. The lithium iron phosphate nano sheets extend from the outer surface of the hierarchical structure to the sphere centre. The clearance can be decreased from the outer surface of the lithium iron phosphate hierarchical structure to the sphere centre until the adjacent lithium iron phosphate nano sheets may come into contact with each other at the sphere centre.

A diameter of the lithium iron phosphate hierarchical structure (i.e., a maximum diameter of the regular sphere or the similar sphere) can be in a range from about 3 microns to about 30 microns. The thickness of the lithium iron phosphate nano sheets can be in a range from about 10 nanometers to about 50 nanometers. A distance between the outer ends of the two adjacent lithium iron phosphate nano sheets, at the outer surface of the hierarchical structure, can be in a range from about 1 nanometer to about 1 micron.

Diffusion paths for the Li ions to traverse from the core of the particles to the surface through the lattice of olivine type lithium iron phosphate is one dimension paths parallel to crystal axis b of the olivine type lithium iron phosphate. Therefore, the lithium iron phosphate having a sheet shape with a surface parallel to the ac crystal plane of the crystal lattice is the most advantageous to the Li ions traversing. Further, the lithium iron phosphate having a sheet shape with a thickness smaller than 50 nanometers can have a relatively good dynamics performance of the intercalation and deintercalation of Li ions. In the embodiments of the lithium iron phosphate hierarchical structure, the lithium iron phosphate nano sheets have a surface parallel to the ac crystal plane of the lithium iron phosphate, and have a thickness direction parallel to the crystal axis b of the lithium iron phosphate. Therefore, the lithium iron phosphate hierarchical structure has a relatively small traversing path for the Li ions, thus has a decreased Li ion diffusion path, and an improved dynamics performance of the material.

Further, compared with nano grains, the lithium iron phosphate hierarchical structure has a decreased specific surface area, and needs fewer conductive agents and binders. Furthermore, compared with a hierarchical structure composed by disorderly aggregated nano grains, the lithium iron phosphate hierarchical structure has an orderly stacked manner, and thus has an increased tap density.

The solvothermal method for making the lithium iron phosphate hierarchical structure directly prepares the lithium iron phosphate nano sheets assembled to the lithium iron phosphate hierarchical structure by the self-assemble process. The solvothermal method results the two crucial shapes: nano sheet shaped primary structure and spherical hierarchical structure by using one step. The achieved lithium iron phosphate hierarchical structure includes a plurality of lithium iron phosphate nano sheets. The lithium iron phosphate nano sheets have a nanosized thickness, and can decrease the diffusion path for the Li ions. Further, the achieved lithium iron phosphate hierarchical structure not only has the decreased diffusion path for the Li ions, but also has a micron sized spherical shape. The micron sized spherical-shaped lithium iron phosphate hierarchical structure has a relatively high tap density and is advantageous for preparing the electrode slurry and the coating of the electrode slurry, during the manufacturing of the lithium ion battery.

One embodiment of a lithium ion battery includes a cathode electrode, an anode electrode, and a non-aqueous electrolyte disposed between the cathode electrode and the anode electrode. The cathode electrode includes a cathode current collector and a cathode material layer disposed on a surface of the cathode current collector. The anode electrode includes an anode current collector and an anode material layer disposed on a surface of the anode current collector.

In one embodiment, the cathode material layer can include a plurality of lithium iron phosphate hierarchical structures as the cathode active material, a conductive agent, and a binder uniformly mixed with each other. The anode material layer can include a plurality of anode active material particles, a conductive agent, and a binder uniformly mixed with each other.

The anode active material particle can be lithium titanate (e.g., $Li_4Ti_5O_{12}$), graphite, acetylene black, organic cracking carbon, mesocarbon microbeads (MCMB), or any combination thereof. The conductive agent can be at least one of acetylene black, carbon fibers, carbon nanotubes, and graphite. The binder can be at least one of polyvinylidene fluoride (PVDF), polytetrafluoroethylene (PTFE), and styrene-butadiene rubber (SBR). The non-aqueous electrolyte can be a solid film or a solution including a lithium salt dissolved in an organic solvent. The lithium salt may be at least one of $LiPF_6$, LiBOB, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiCl, and LiI. The organic solvent can be a cyclic carbonate and linear carbonate, and can be at least one of ethylene carbonate (EC), propylene carbonate (PC), ethylmethyl carbonate (EMC), diethyl carbonate (DEC), and dimethyl carbonate (DMC). The lithium ion battery can further include a porous membrane or a separator located between the cathode electrode and the anode electrode. The material of the separator can be polypropylene (PP) or polyethylene (PE). The lithium ion battery can further include an exterior encapsulating structure such as a hard battery case or a soft encapsulating bag. The lithium ion battery can further include a connecting component achieving an electrical connection between the current collector of the lithium ion battery and the external circuit.

Example 1

Figure 2:
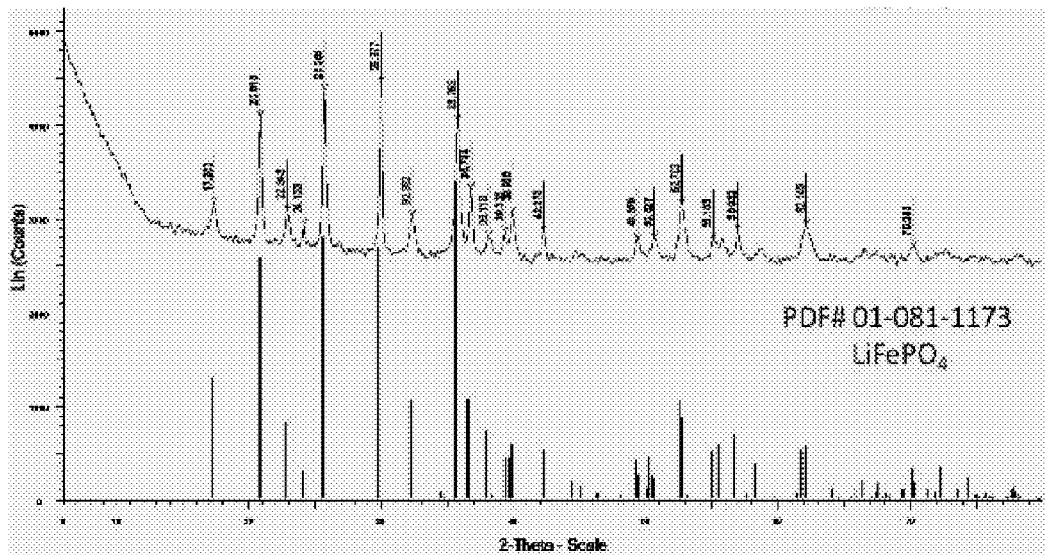
FIG. 2 is an X-ray diffraction (XRD) pattern of the lithium iron phosphate hierarchical structure formed in an Example 1.
Figure 3A:
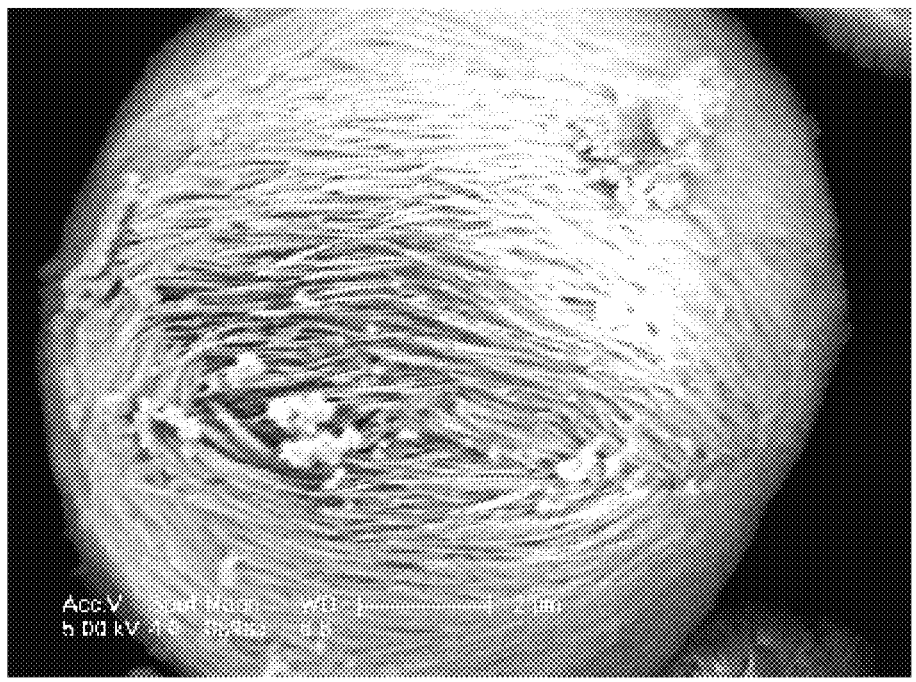
FIGS. 3A-3D show Scanning Electron Microscope (SEM) images of the lithium iron phosphate hierarchical structure formed in the Example 1.
Figure 3B:
Figure 3C:
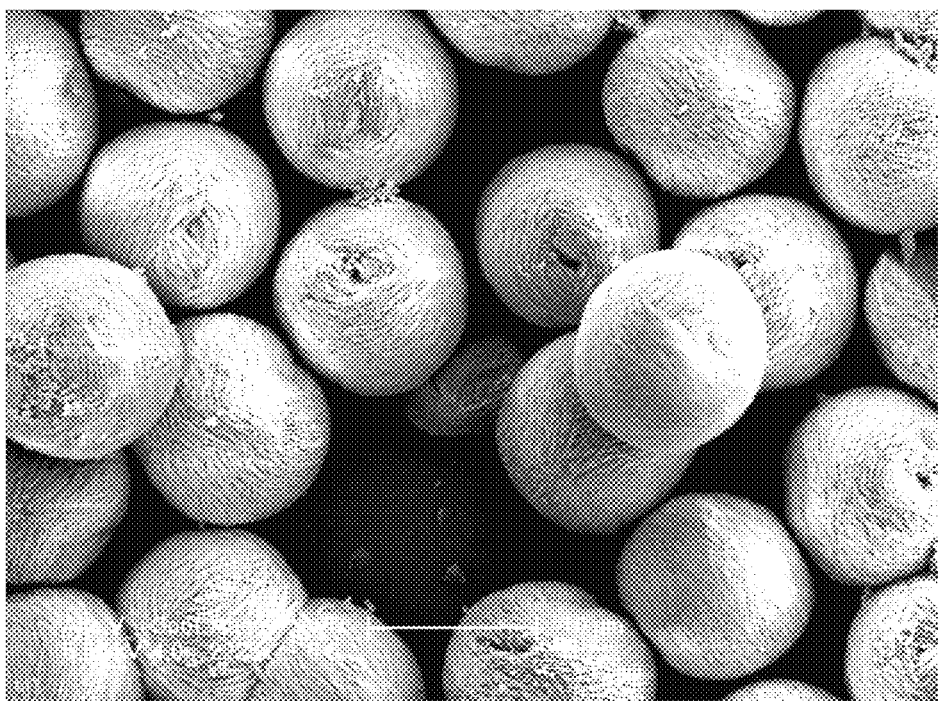
Figure 3D:
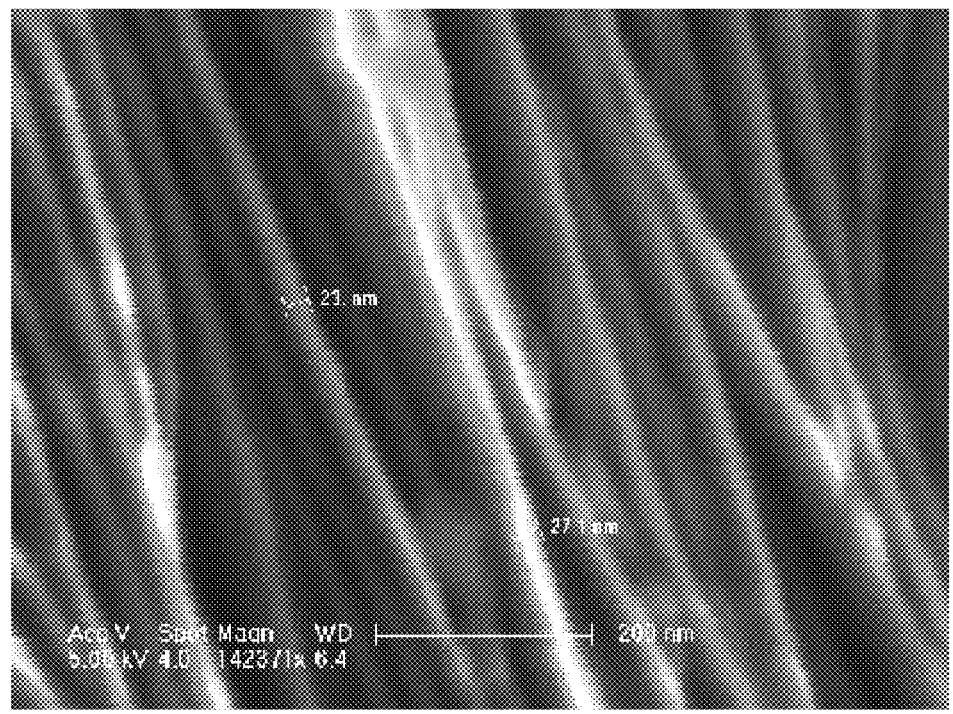

In the Example 1, the lithium chemical compound is $LiOH.H_2O$, the ferrous chemical compound is $FeSO_4.7H_2O$, and the phosphor chemical compound is $H_3PO_4$, the organic solvent is ethylene glycol. First, about 1.6184 g $LiOH.H_2O$ is dissolved in about 18.9 mL ethylene glycol, to achieve a LiOH solution having the concentration of the $Li^+$ of about 2 mol/L. The LiOH reaches to the saturation state in the ethylene glycol. Second, about 3.8922 g $FeSO_4.7H_2O$ is dissovled in about 23.3 mL ethylene glycol, to achieve a $FeSO_4$ solution having the concentration of the $Fe^{2+}$ of about 0.6 mol/L. Third, about 944 μL $H_3PO_4$ is added in the $FeSO_4$ solution and stirred to be uniformly mixed with the $FeSO_4$ solution. Then, the LiOH solution is added into the mixture of the $FeSO_4$ solution and the $H_3PO_4$, and stirred for about 30 minutes to achieve a final liquid mixture. In the achieved liquid mixture, a molar ratio among the LiOH, $FeSO_4$, and $H_3PO_4$ is about 2.7:1:1. Then, the liquid mixture is disposed in the solvothermal reactor to have a solvothermal react at about 180° C. for about 10 hours. Finally, the solvothermal reactor is opened and stood in room temperature to cool the product. The product is washed by deionized water for 5 times and dried at about 60° C. The XRD test is processed to the product. Referring to FIG. 2, the XRD pattern of the product matches with a standard XRD pattern of LiFePO4, proves that the product is LiFePO4.

Referring to FIGS. 3a-3d, the product is observed by using SEM test, and the hierarchical structures of the $LiFePO_4$ can be observed. The $LiFePO_4$ hierarchical structures are regular spherical-shaped structures, meanwhile, the plurality of $LiFePO_4$ hierarchical structures have a uniform size. The diameter of the regular spherical-shaped $LiFePO_4$ hierarchical structures is in a range from about 10 microns to about 15 microns (e.g., about 12 microns). Each of the regular spherical-shaped $LiFePO_4$ hierarchical structures is constructed by a plurality of $LiFePO_4$ nano sheets having nano-sized thickness. The plurality of $LiFePO_4$ nano sheets are layered together. In each $LiFePO_4$ hierarchical structure, a clearance between adjacent two $LiFePO_4$ nano sheets is in a range from about 5 nanometers to about 40 nanometers at the outer surface of the $LiFePO_4$ hierarchical structure. Accordingly, the density of each $LiFePO_4$ hierarchical structure is relatively large. A thickness of the $LiFePO_4$ nano sheet is in a range from about 20 nanometers to about 30 nanometers. The tap density of the $LiFePO_4$ hierarchical structures is about 2.9 $g/cm^3$.

Comparative Example 1-1

Figure 4A:
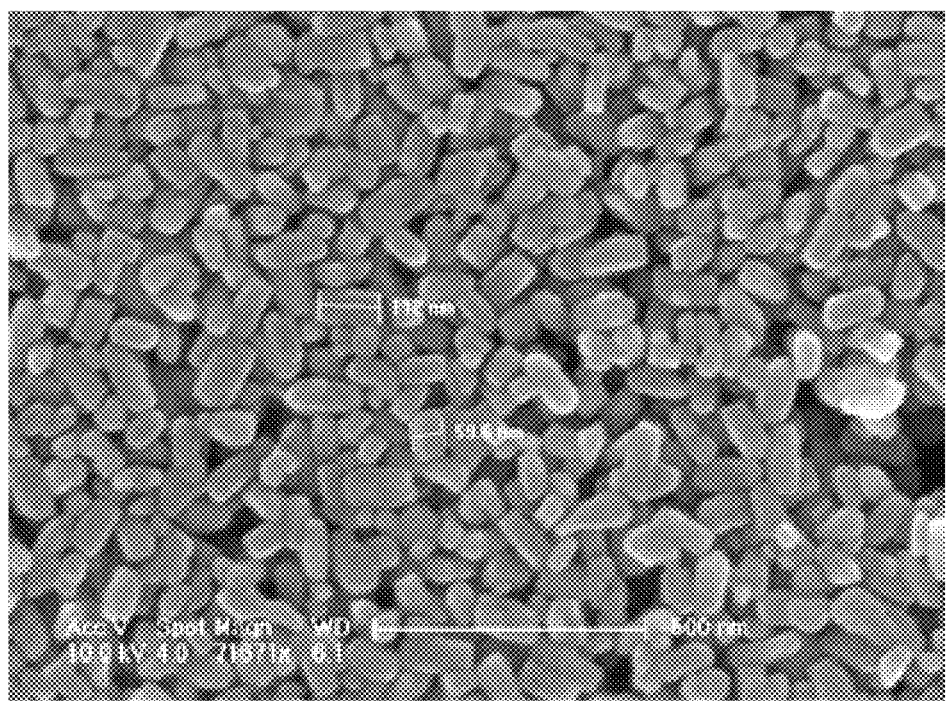
FIGS. 4A-4B show SEM images of a lithium iron phosphate formed in a comparative Example 1-1.
Figure 4B:
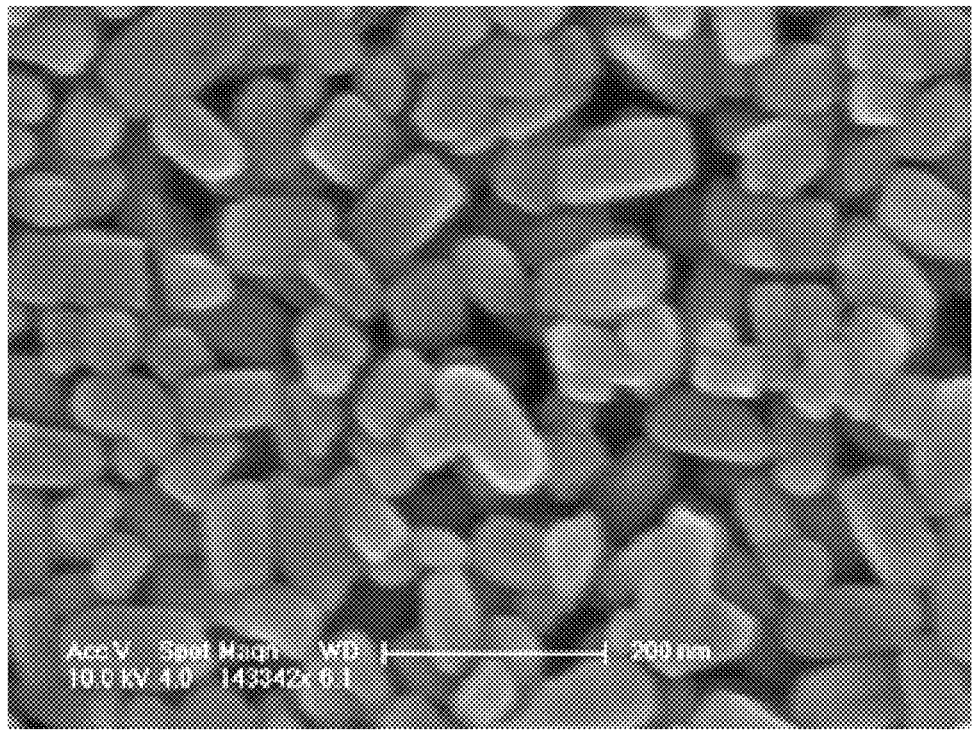

The reacting conditions in this Comparative Example 1-1 are the same as in the Example 1, except that the concentration of the $Li^+$ in the LiOH solution is about 0.75 mol/L. In the Comparative Example 1-1, $LiFePO_4$ nano grains are achieved. Referring to FIG. 4a-4b, from the SEM photo, it can be observed that the nano grains are solid grains, each of which does not constructed by a plurality of nano sheets. A diameter of the $LiFePO_4$ nano grains are about 50 nanometers to about 120 nanometers. The nano grains are only primary structures, and a hierarchical structure has not been achieved.

Comparative Example 1-2

Figure 5A:
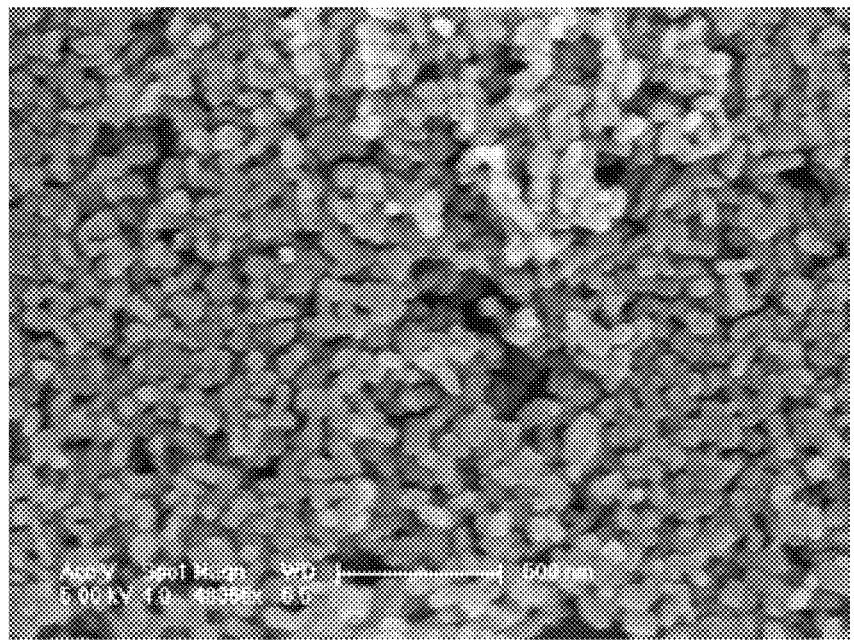
FIGS. 5A-5B show SEM images of a lithium iron phosphate formed in a comparative Example 1-2.
Figure 5B:
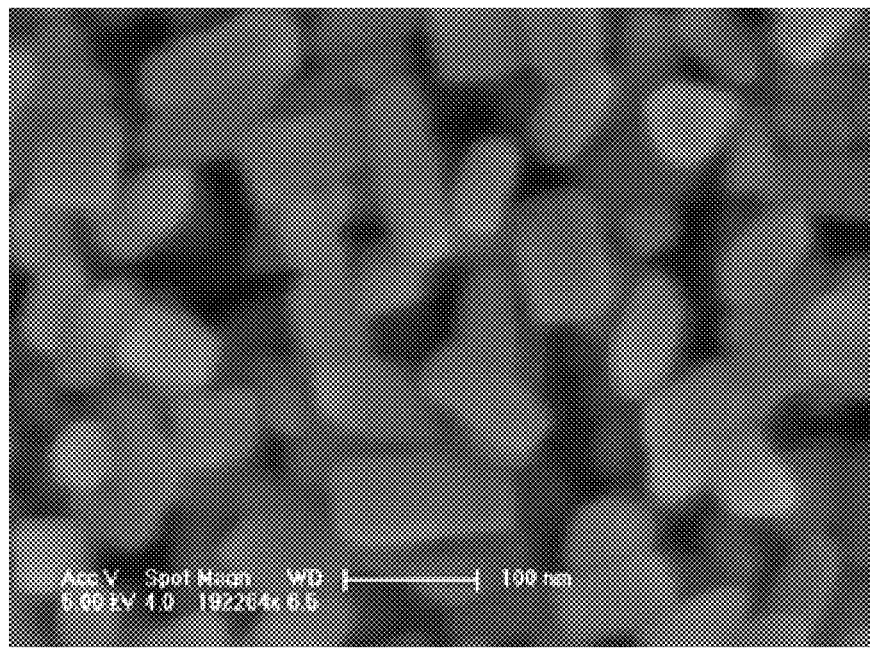

The reacting conditions in this Comparative Example 1-2 are the same as in the Example 1, except that the concentration of the $Li^+$ in the LiOH solution is about 1.5 mol/L. In the Comparative Example 1-2, $LiFePO_4$ nano grains are achieved. Referring to FIG. 5a-5b, from the SEM photo, it can be observed that the nano grains are also solid grains, each of which does not constructed by a plurality of nano sheets. A diameter of the $LiFePO_4$ nano grains in the Comparative Example 1-2 are smaller than in the Comparative Example 1-1. The nano grains are also only primary structures, and a hierarchical structure has not been achieved.

From the above two comparative examples, it can be seen that the spherical hierarchical structure cannot be achieved by using the decreased $Li^+$ concentration of the LiOH solution.

Example 2

In Example 2, the lithium chemical compound is $LiOH \cdot H_2O$, the ferrous chemical compound is $FeSO_4 \cdot 7H_2O$, and the phosphor chemical compound is $H_3PO_4$, the organic solvent is a mixing solvent of ethylene glycol and glycerol in a volume ratio of 2:1. First, about 1.6184 g $LiOH \cdot H_2O$ is dissolved in about 18.9 mL mixing solvent, to achieve a LiOH solution having the concentration of the $Li^+$ of about 2 mol/L. Second, about 3.8922 g $FeSO_4 \cdot 7H_2O$ is dissovled in about 23.3 mL mixing solvent, to achieve a $FeSO_4$ solution having the concentration of the $Fe^{2+}$ of about 0.6 mol/L. Third, about 944 µL $H_3PO_4$ is added in the $FeSO_4$ solution and stirred to be uniformly mixed with the $FeSO_4$ solution. Then, the LiOH solution is added into the mixture of the $FeSO_4$ solution and the $H_3PO_4$, and stirred for about 30 minutes to achieve a final liquid mixture. In the achieved liquid mixture, a molar ratio among the LiOH, $FeSO_4$, and $H_3PO_4$ is about 2.7:1:1.5. Then, the liquid mixture is disposed in the solvothermal reactor to have a solvothermal react at about 180° C. for about 10 hours. Finally, the solvothermal reactor is opened and stood in room temperature to cool the product which is $LiFePO_4$ hierarchical structures.

Figure 6A:
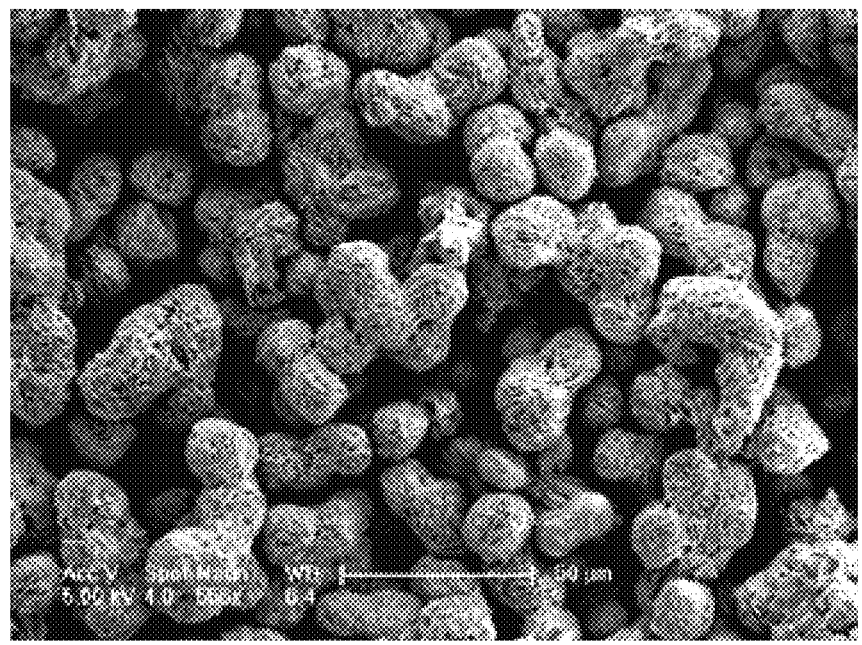
FIGS. 6A-6C show SEM images of a lithium iron phosphate hierarchical structure formed in an Example 2.
Figure 6B:
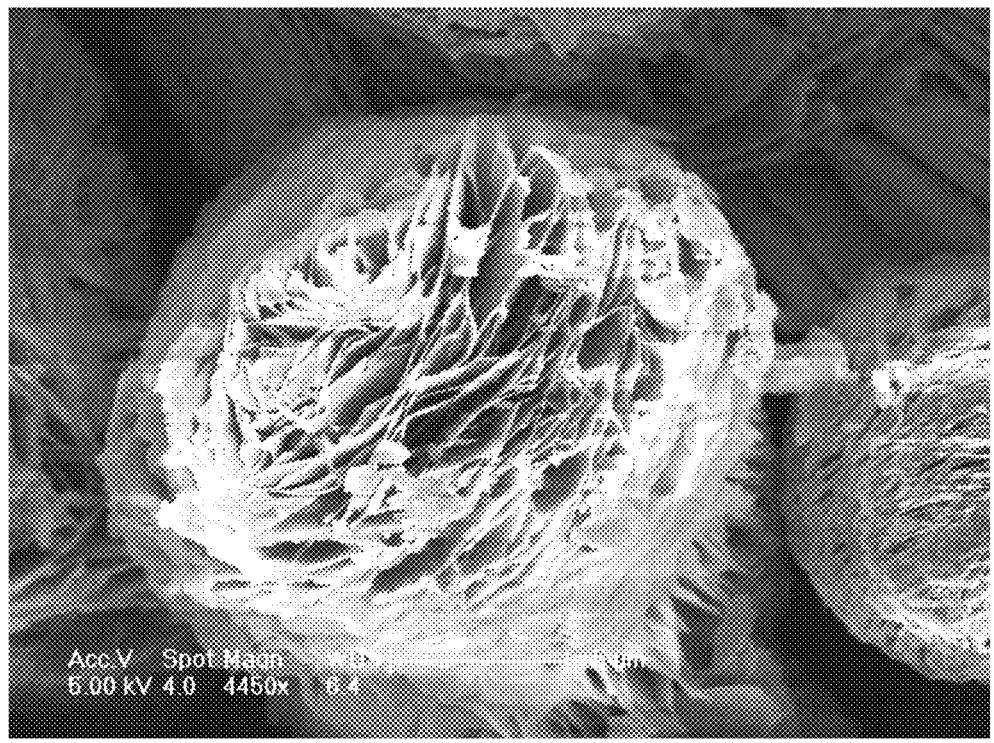
Figure 6C:
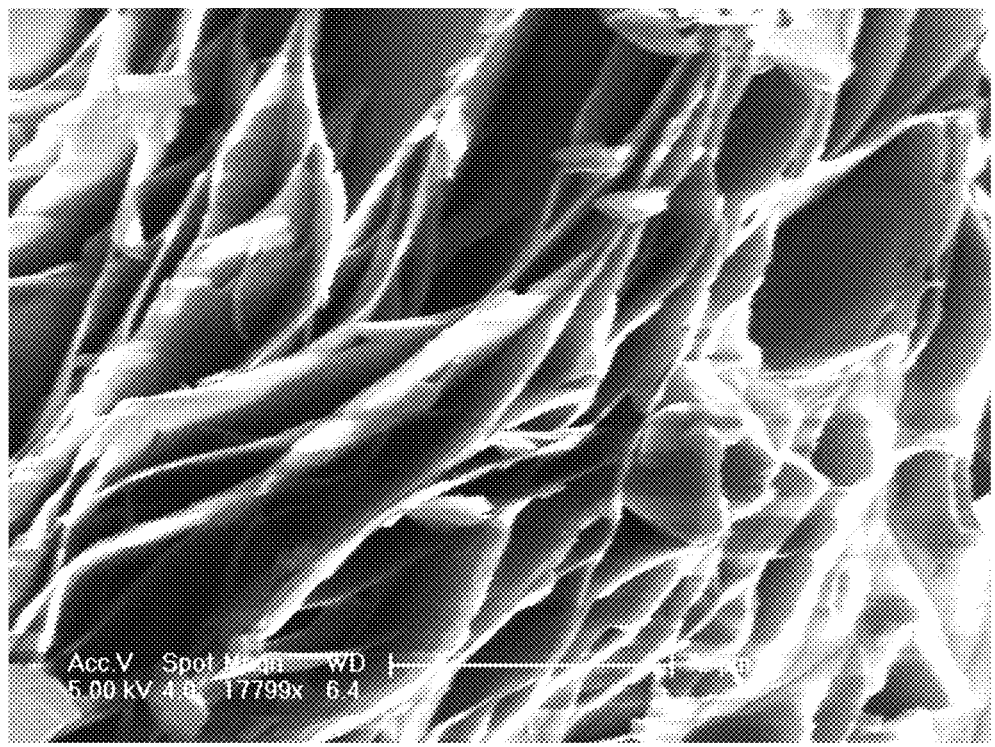

Referring to FIG. 6a-6c, the $LiFePO_4$ hierarchical structures are observed by using SEM test. The $LiFePO_4$ hierarchical structures are regular spherical-shaped structures, meanwhile, the plurality of $LiFePO_4$ hierarchical structures have a uniform size. The diameter of the regular spherical-shaped $LiFePO_4$ hierarchical structures is in a range from about 15 microns to about 30 microns (e.g., about 20 microns). Each of the regular spherical-shaped $LiFePO_4$ hierarchical structures is constructed by a plurality of $LiFePO_4$ nano sheets having nanosized thickness. The plurality of $LiFePO_4$ nano sheets are layered together. In each $LiFePO_4$ hierarchical structure, a clearance between adjacent two $LiFePO_4$ nano sheets is in a range from about 0.1 microns to about 1 micron at the outer surface of the $LiFePO_4$ hierarchical structure. Accordingly, the $LiFePO_4$ hierarchical structure has a relatively loose structure, and the density of each $LiFePO_4$ hierarchical structure is relatively small. A thickness of the $LiFePO_4$ nano sheet is in a range from about 30 nanometers to about 40 nanometers. Two or more spherical hierarchical structures joined together can be existed in the product. The tap density of the $LiFePO_4$ hierarchical structures is about 2.5 $g/cm^3$.

Comparative Example 2-1

The reacting conditions in this Comparative Example 2-1 are the same as in the Example 2, except that the concentration of the $Li^+$ in the LiOH solution is about 0.75 mol/L. No peak matched to the standard peaks of $LiFePO_4$ can be achieved in the XRD test of the achieved product. Therefore, in this comparative example, no $LiFePO_4$ has been achieved.

Comparative Example 2-2

Figure 7A:
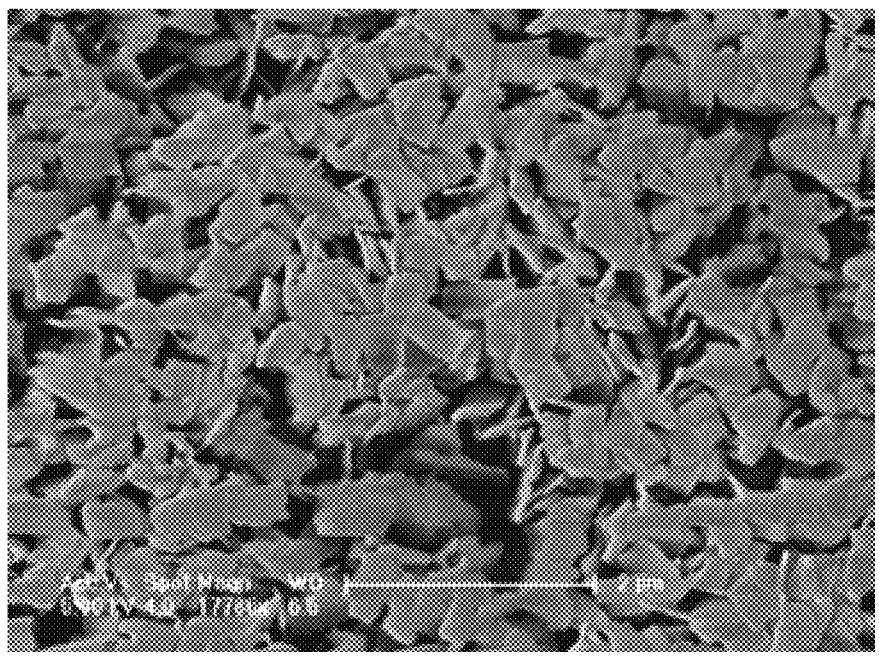
FIGS. 7A-7B show SEM images of a lithium iron phosphate formed in a comparative Example 2-1.
Figure 7B:
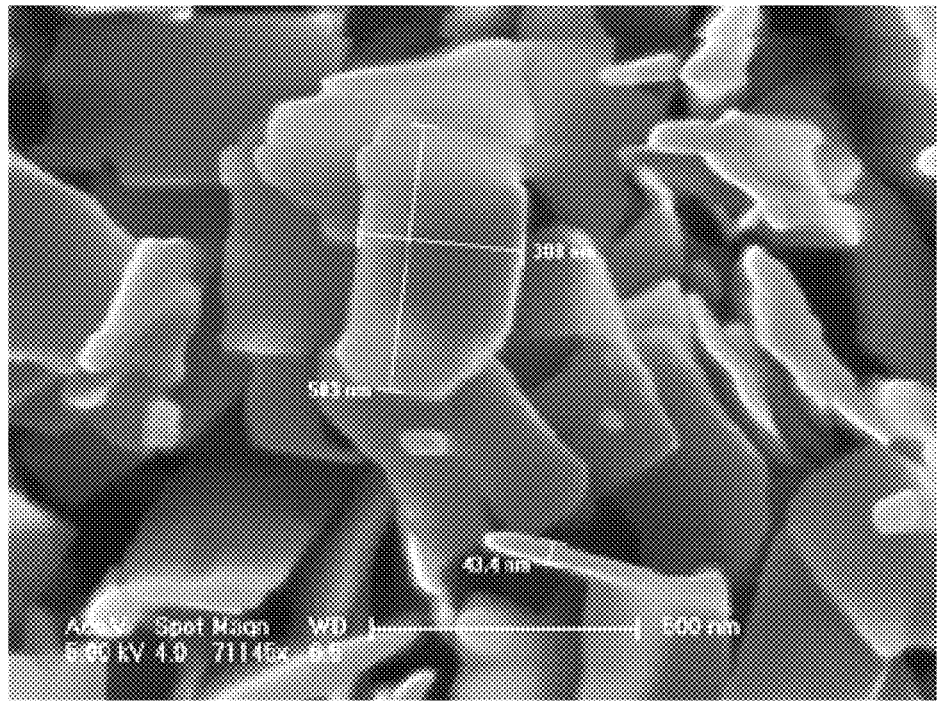

The reacting conditions in this Comparative Example 2-2 are the same as in the Example 2, except that the concentration of the $Li^+$ in the LiOH solution is about 1.5 mol/L. Referring to FIGS. 7a-7b, from the SEM photo, it can be seen that the product is $LiFePO_4$ nano plates having a thickness of about 40 nanometers, and a size above 200 nanometers. However, these $LiFePO_4$ nano plates are also primary structures. No hierarchical structure constructed by the primary structures has been achieved.

From the above two comparative examples, it can be seen that the spherical hierarchical structure cannot be achieved by using the decreased $Li^+$ concentration of the LiOH solution.

Example 3

In Example 3, the lithium chemical compound is $LiOH \cdot H_2O$, the ferrous chemical compound is $FeSO_4 \cdot 7H_2O$, and the phosphor chemical compound is $H_3PO_4$, the organic solvent is ethylene glycol. First, about 1.6184 g $LiOH \cdot H_2O$ is dissolved in about 18.9 mL ethylene glycol, to achieve a LiOH solution having the concentration of the $Li^+$ of about 2 mol/L. Second, about 3.8922 g $FeSO_4 \cdot 7H_2O$ is dissovled in about 23.3 mL ethylene glycol, to achieve a $FeSO_4$ solution having the concentration of the $Fe^{2+}$ of about 0.6 mol/L. Third, about 944 μL $H_3PO_4$ is added in the $FeSO_4$ solution and stirred to be uniformly mixed with the $FeSO_4$ solution. Then, the LiOH solution is added into the mixture of the $FeSO_4$ solution and the $H_3PO_4$, and stirred for about 30 minutes to achieve a final liquid mixture. In the achieved liquid mixture, a molar ratio among the LiOH, $FeSO_4$, and $H_3PO_4$ is about 2.7:1:6/7. Then, the liquid mixture is disposed in the solvothermal reactor to have a solvothermal react at about 160° C. for about 8 hours. Finally, the solvothermal reactor is opened and rested at room temperature to cool the product. The product is washed by deionized water for 5 times and dried at about 60° C. The product is LiFePO4 hierarchical structures.

Figure 8A:
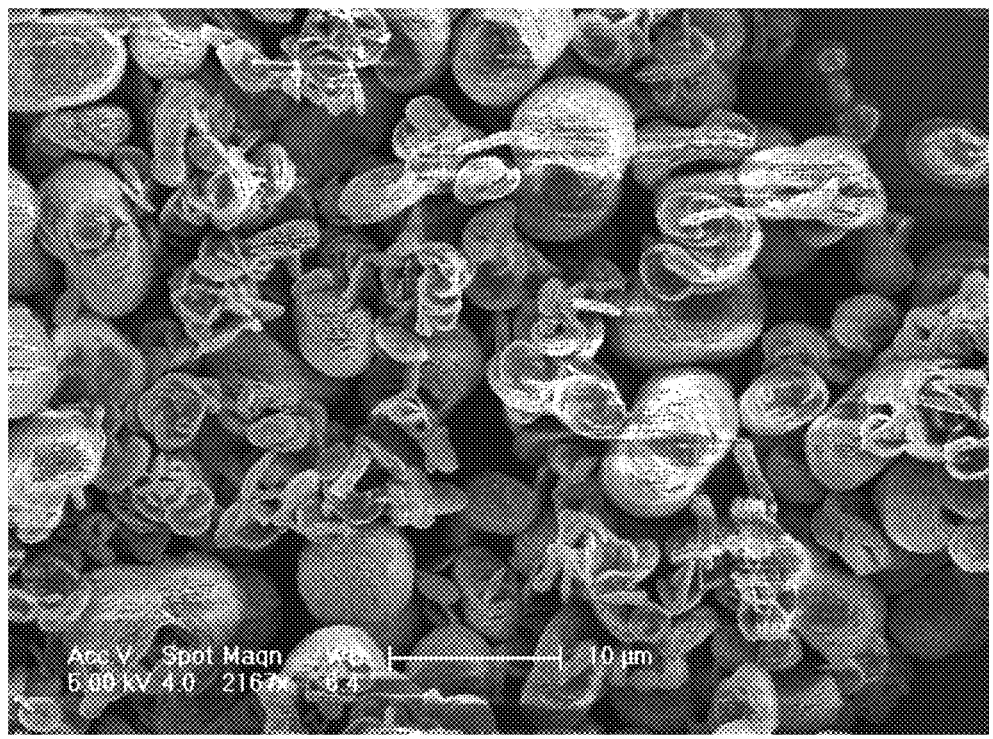
FIGS. 8A-8B show SEM images of a lithium iron phosphate hierarchical structure formed in an Example 3.
Figure 8B:
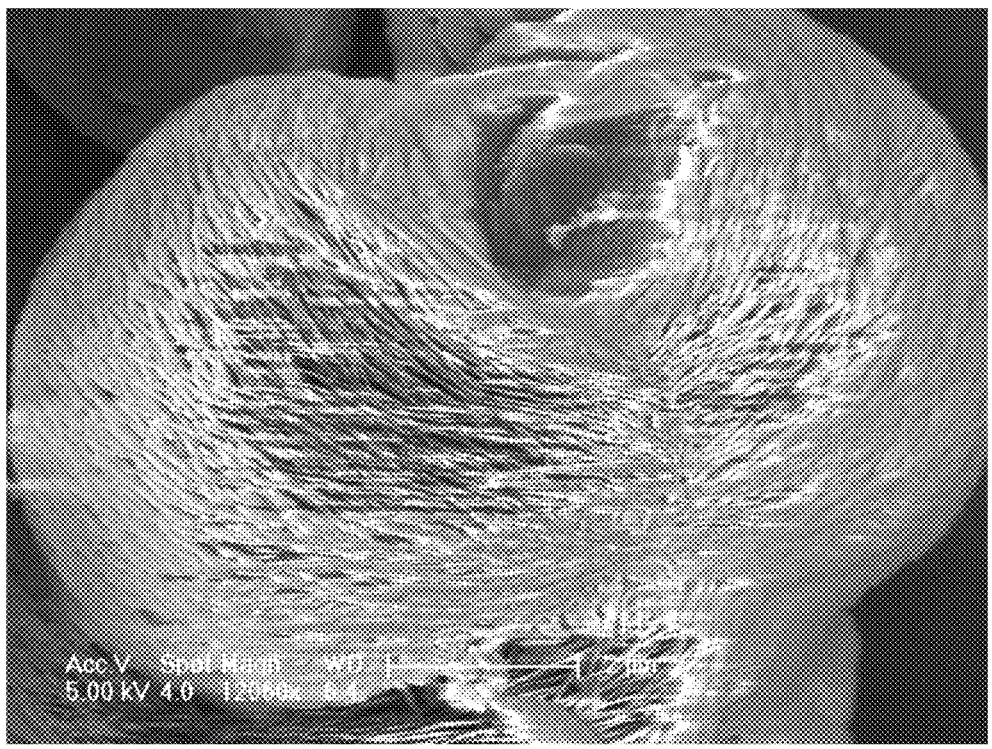

Referring to FIGS. 8a-8b, the $LiFePO_4$ hierarchical structures is observed by using SEM test. The $LiFePO_4$ hierarchical structures are similar spherical-shaped structures. The plurality of $LiFePO_4$ nano sheets can be divided into two groups, respectively located at two sides of a first plane. The $LiFePO_4$ nano sheets in each group are radially arranged from a centre of the similar spherical-shaped structures, and are layered with each other from a second plane perpendicular to the first plane. The radially layering of the $LiFePO_4$ nano sheets may not reach the first plane, thus there can be an angle between the $LiFePO_4$ nano sheets in the two groups, and a platelet shaped $LiFePO_4$ hierarchical structure can be achieved. In the platelet shaped $LiFePO_4$ hierarchical structure, the thickness at the outer surface is larger than the thickness at the centre. A size of the $LiFePO_4$ hierarchical structure in the second plane (i.e., the largest size) can be in a range from about 3 microns to about 12 microns (e.g., 10 microns). A size of the $LiFePO_4$ hierarchical structure in the first plane (i.e., the smallest size) can be in a range from about 0.5 microns to about 8 microns (e.g., 6 microns). In some other achieved $LiFePO_4$ hierarchical structure, the angle between the $LiFePO_4$ nano sheets in the two groups can be relatively small. In still some other achieved $LiFePO_4$ hierarchical structure, the $LiFePO_4$ nano sheets in the two groups can reach the first plane to form a complete spherical-shaped hierarchical structure. The tap density of the $LiFePO_4$ hierarchical structures is about 2.2 $g/cm^3$.

Comparative Example 3-1

Figure 9A:
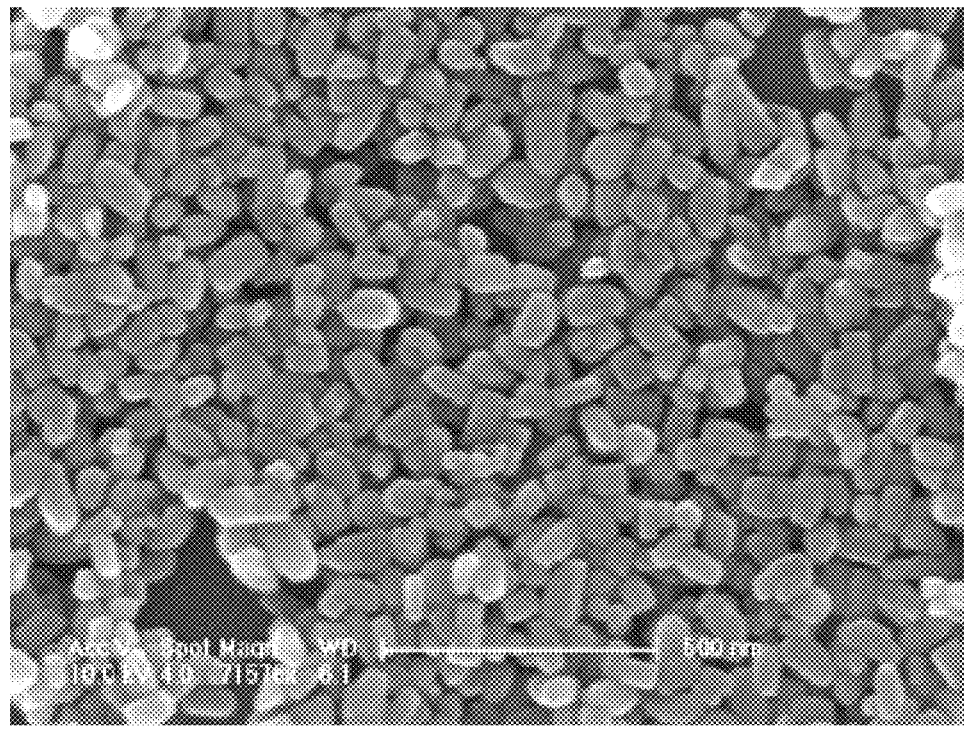
FIGS. 9A-9B show SEM image of a lithium iron phosphate formed in a comparative Example 3-1.
Figure 9B:
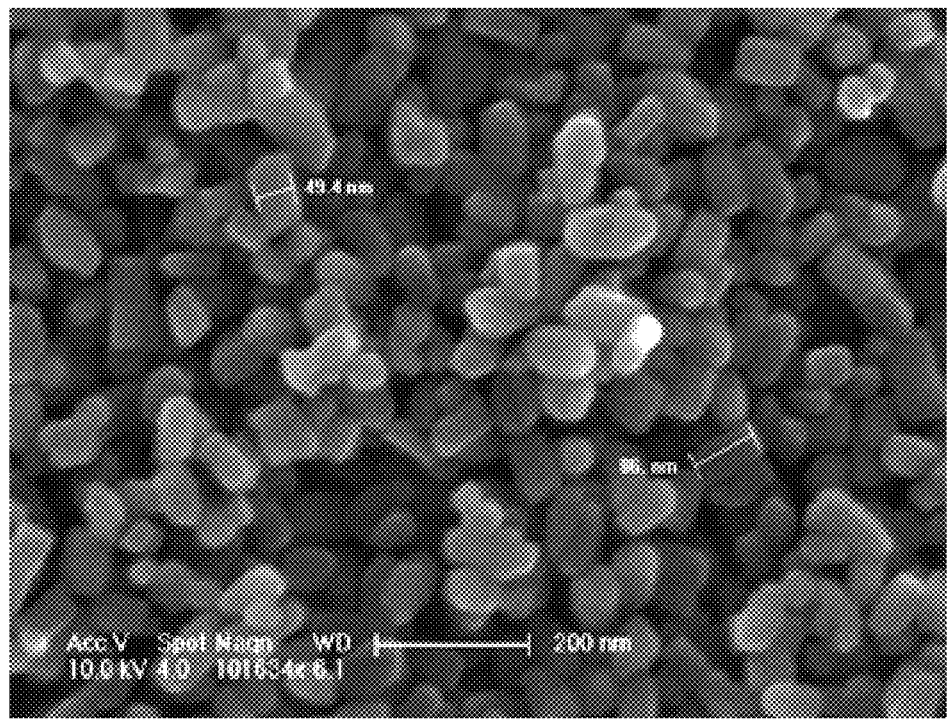

The reacting conditions in this Comparative Example 3-1 are the same as in the Example 3, except that the concentration of the $Li^+$ in the LiOH solution is about 0.75 mol/L. Referring to FIGS. 9a-9b, from the SEM photo, it can be seen that the product is $LiFePO_4$ nano grains having a size of about 40 nanometers to about 80 nanometers. However, these $LiFePO_4$ nano grains are not constructed by nano sheets. The $LiFePO_4$ nano grains are primary structures. No hierarchical structure constructed by the primary structures has been achieved.

Comparative Example 3-2

Figure 10:
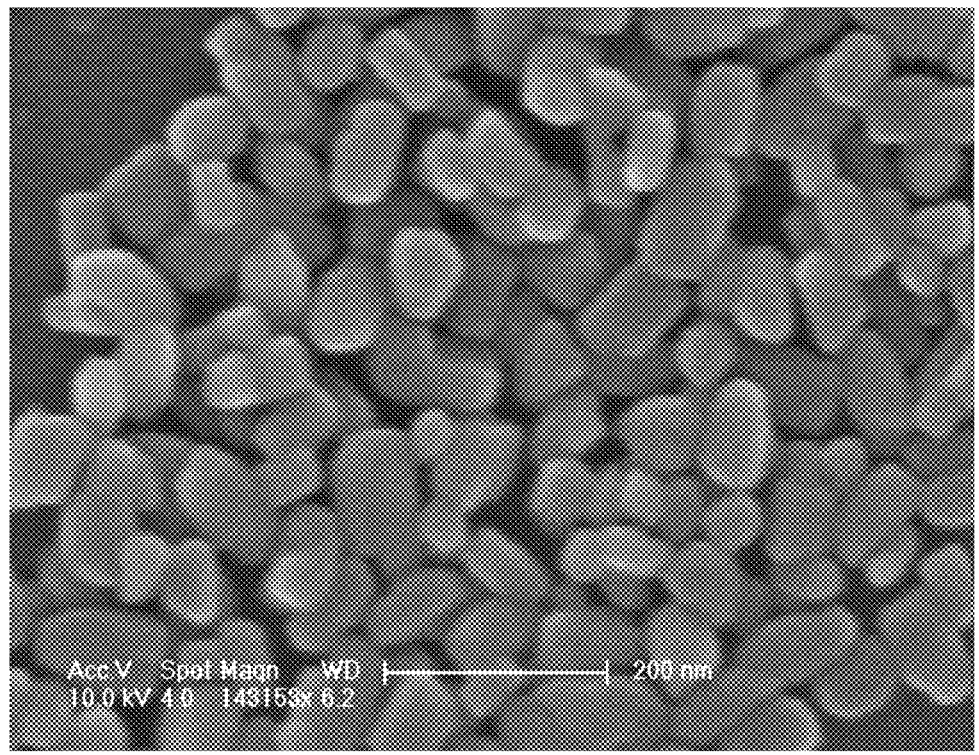
FIG. 10 shows a SEM image of a lithium iron phosphate formed in a comparative Example 3-2.

The reacting conditions in this Comparative Example 3-2 are the same as in the Example 3, except that the concentration of the $Li^+$ in the LiOH solution is about 1.5 mol/L. Referring to FIG. 10, from the SEM photo, it can be seen that the product is also solid $LiFePO_4$ nano grains having a size of about 40 nanometers to about 80 nanometers. These $LiFePO_4$ nano plates are also primary structures. No hierarchical structure constructed by the primary structures has been achieved.

From the above two comparative examples, it can be seen that the spherical hierarchical structure cannot be achieved by using the decreased $Li^+$ concentration of the LiOH solution.

Example 4

In Example 4, the lithium chemical compound includes $LiOH.H_2O$ and $CH_3COOLi$. A molar ratio of the $LiOH.H_2O$ to the $CH_3COOLi$ is about 2:1. The ferrous chemical compound is $FeSO_4.7H_2O$. The phosphor chemical compound is $H_3PO_4$. The organic solvent is ethylene glycol. First, $LiOH.H_2O$ and $CH_3COOLi$ are dissolved in the ethylene glycol together, to achieve a lithium source solution having the concentration of the $Li^+$ of about 3 mol/L. Second, $FeSO_4.7H_2O$ is dissovled in the ethylene glycol, to achieve a $FeSO_4$ solution having the concentration of the $Fe^{2+}$ of about 0.6 mol/L. Third, the $H_3PO_4$ is added in the $FeSO_4$ solution and stirred to be uniformly mixed with the $FeSO_4$ solution. Then, the lithium source solution is added into the mixture of the $FeSO_4$ solution and the $H_3PO_4$, and stirred for about 30 minutes to achieve a final liquid mixture. In the achieved liquid mixture, an element molar ratio among the Li, Fe, and P is about 3:1:1.5. Then, the liquid mixture is disposed in the solvothermal reactor to have a solvothermal react at about 180° C. for about 10 hours. Finally, the solvothermal reactor is opened and stood in room temperature to cool the product. The product is washed by deionized water for 5 times and dried at about 60° C. The product is $LiFePO_4$ hierarchical structures.

Figure 11:
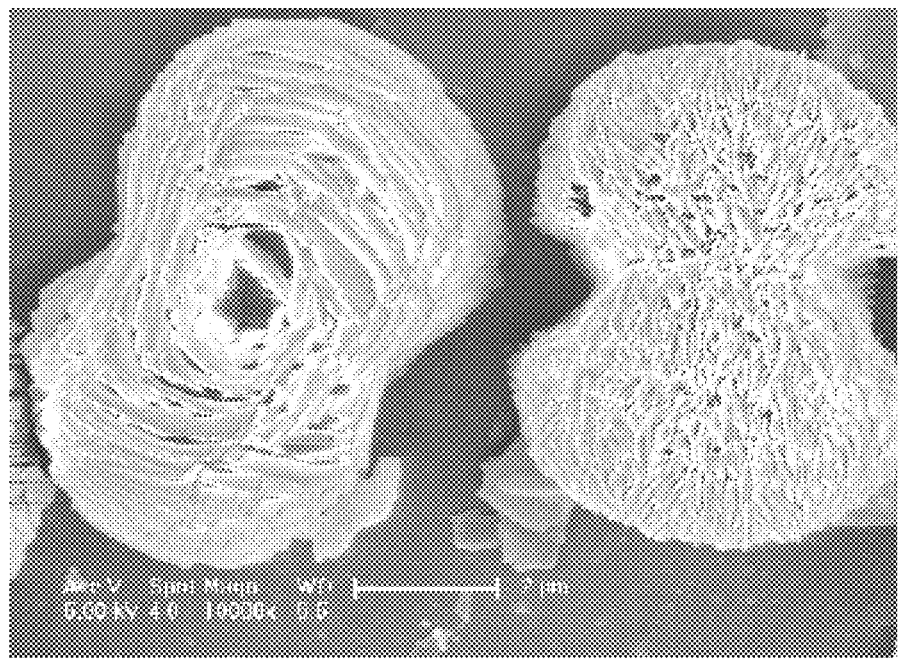
FIG. 11 shows a High Resolution Transmission Electron Microscope (HRTEM) image of a lithium iron phosphate hierarchical structure formed in an Example 4.

Referring to FIG. 11, the $LiFePO_4$ hierarchical structures is observed by using SEM. The $LiFePO_4$ hierarchical structures are similar to the product achieved in the Example 3, and are similar spherical-shaped structures. A size of the $LiFePO_4$ hierarchical structure in the second plane (i.e., the largest size) can be in a range from about 6 microns to about 8 microns. A size of the $LiFePO_4$ hierarchical structure in the first plane (i.e., the smallest size) can be in a range from about 3 microns to about 4 microns.

Example 5

In the Example 5, the $LiFePO_4$ hierarchical structures achieved in the Example 1 is further sintered in a protective atmosphere (e.g., in $N_2$ gas) at 600° C. The sintered $LiFePO_4$ hierarchical structures are used as a cathode active material. A lithium ion battery using the sintered $LiFePO_4$ hierarchical structures as the cathode active material is assembled. The anode electrode is lithium metal. The lithium ion battery is cycled at a current of about 0.5 C at room temperature. A first discharge capacity of the lithium ion battery is about 155 mAh/g.

Example 6

In the Example 6, the $LiFePO_4$ hierarchical structures achieved in the example 2 is further sintered in a protective atmosphere (e.g., in $N_2$ gas) at 650° C. The sintered $LiFePO_4$ hierarchical structures are used as a cathode active material. A lithium ion battery using the sintered $LiFePO_4$ hierarchical structures as the cathode active material is assembled. The anode electrode is lithium metal. The lithium ion battery is cycled at a current of about 0.5 C at room temperature. A first discharge capacity of the lithium ion battery is about 153 mAh/g.

Example 7

In the Example 7, the $LiFePO_4$ hierarchical structures achieved in the Example 3 is further sintered in a protective atmosphere (e.g., in $N_2$ gas) at 600° C. The sintered $LiFePO_4$ hierarchical structures are used as a cathode active material. A lithium ion battery using the sintered $LiFePO_4$ hierarchical structures as the cathode active material is assembled. The anode electrode is lithium metal. The lithium ion battery is cycled at a current of about 0.5 C at room temperature. A first discharge capacity of the lithium ion battery is about 147 mAh/g.

Figure 12:
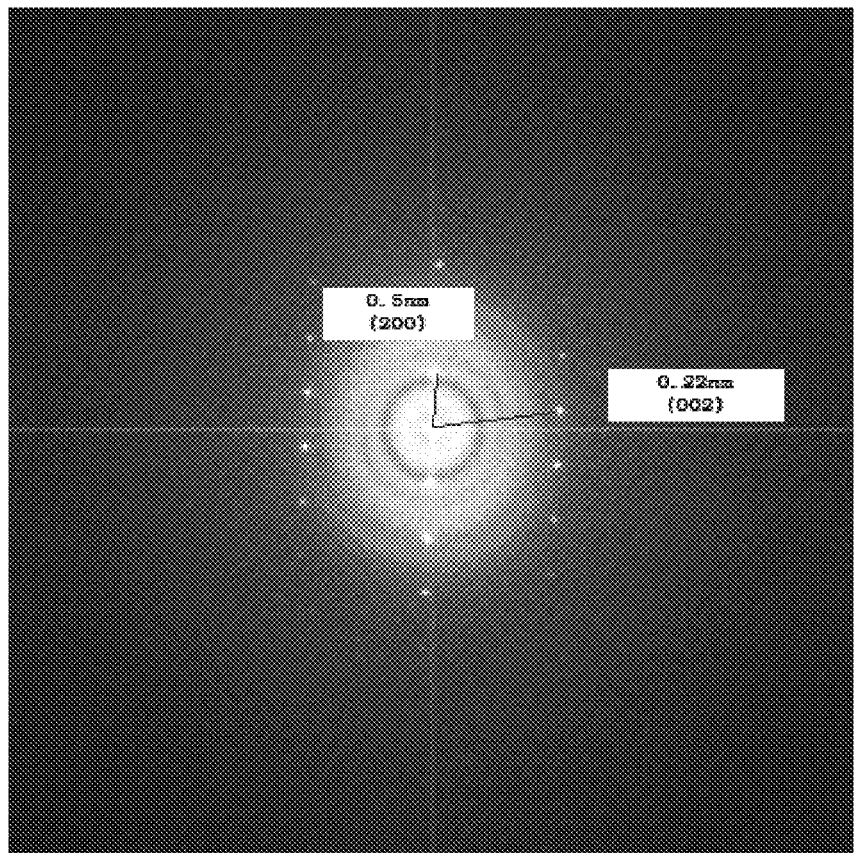
FIG. 12 is an electron diffraction pattern of one embodiment of the lithium iron phosphate hierarchical structure under the HRTEM.
Figure 13:
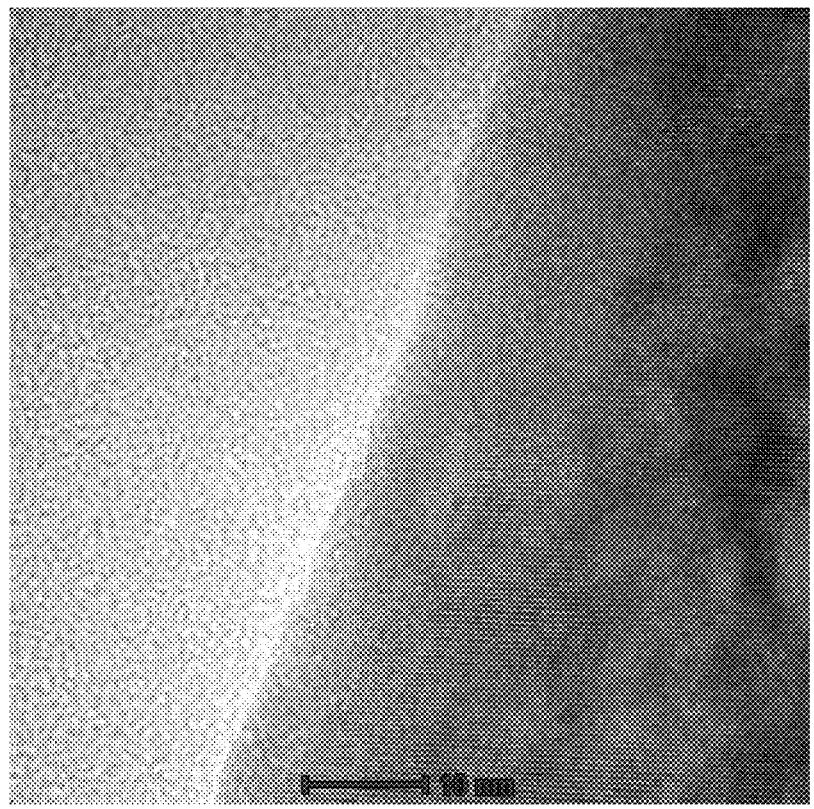
FIG. 13 is a Transmission Electron Microscope (TEM) image of one embodiment of a lithium iron phosphate hierarchical structure.

The lithium iron phosphate nano sheets of the lithium iron phosphate hierarchical structure is observed by using HRTEM. The lattice orientation of the lithium iron phosphate nano sheets is tested by using the electron diffraction pattern. The electron diffraction pattern can prove that the surface of the lithium iron phosphate nano sheet is the ac crystal plane of the olivine type lithium iron phosphate, and the thickness direction of the lithium iron phosphate nano sheet is parallel to the crystal axis b of the olivine type lithium iron phosphate. Referring to FIG. 12 and FIG. 13, the electron diffraction pattern and the HRTEM image are achieved by observing the lithium iron phosphate hierarchical structure achieved in the Example 1 along the direction perpendicular to the surface of the lithium iron phosphate nano sheet thereof. The distance between crystal planes can be measured by the electron diffraction pattern. Referring to FIG. 12, the spots distributed as a matrix are the electron diffraction spots of the lithium iron phosphate hierarchical structure. The circles in background corresponds to a carbon film used as a sample support. The distance of 0.5 nanometer labeled in the FIG. 12 corresponds to the crystal plane (200) of the olivine type lithium iron phosphate. The distance of 0.22 nm labeled in the FIG. 12 corresponds to the crystal plane (002) of the olivine type lithium iron phosphate. Therefore, the surface of the lithium iron phosphate nano sheet is perpendicular to the crystal axis b (i.e., [010] direction) of the olivine type lithium iron phosphate. That is, the thickness direction of the lithium iron phosphate nano sheet is the [010] direction.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A lithium iron phosphate hierarchical structure comprising an overall spherical-shaped structure; and the overall spherical-shaped structure comprises a plurality of lithium iron phosphate nano sheets layered together;
wherein a plurality of clearances are defined between the plurality of lithium iron phosphate nano sheets, at an outer surface of the overall spherical-shaped structure; each of the plurality of clearances is in a range from about 1 nanometer to about 1 micron as measured at the outer surface of the overall spherical-shaped structure.

2. The lithium iron phosphate hierarchical structure of claim 1, wherein an extending direction of the plurality of lithium iron phosphate nano sheets is along a direction from an outer surface of the overall spherical-shaped structure to a sphere centre of the overall spherical-shaped structure.

3. The lithium iron phosphate hierarchical structure of claim 2, wherein the plurality of the lithium iron phosphate nano sheets are radially aligned around the sphere centre of the overall spherical-shaped structure.

4. The lithium iron phosphate hierarchical structure of claim 1, wherein the overall spherical-shaped structure has a regular spherical shape or a similar spherical shape; and the similar spherical shape is an ellipsoidal shape, an oblate spheroidal shape, a shape of spherical segment, or a shape of blood platelet.

5. The lithium iron phosphate hierarchical structure of claim 1, wherein each of the plurality of clearances between adjacent two of the plurality of lithium iron phosphate nano sheets is in a range from about 1 nanometer to about 40 nanometers at the outer surface of the overall spherical-shaped structure.

6. The lithium iron phosphate hierarchical structure of claim 1, wherein each of the plurality of clearances between adjacent two of the plurality of lithium iron phosphate nano sheets is in a range from about 0.1 microns to about 1 micron at the outer surface of the overall spherical-shaped structure.

7. The lithium iron phosphate hierarchical structure of claim 1, wherein a thickness of the plurality of lithium iron phosphate nano sheets is in a range from about 10 nanometers to about 50 nanometers.

8. The lithium iron phosphate hierarchical structure of claim 1, wherein a diameter of the overall spherical-shaped structure is in a range from about 3 microns to about 30 microns.

9. The lithium iron phosphate hierarchical structure of claim 1, wherein a first plane and a second plane are defined in the overall spherical-shaped structure, both the first plane and the second plane pass through a sphere centre of the overall spherical-shaped structure, the second plane is perpendicular to the first plane, the plurality of the lithium iron phosphate nano sheets are divided into at least two groups, respectively located on either side of the first plane, the plurality of lithium iron phosphate nano sheets in each group are radially aligned from the sphere centre to an outline of the overall spherical-shaped structure, and radially layered from the second plane to the first plane.

10. The lithium iron phosphate hierarchical structure of claim 1, wherein a thickness direction of the plurality of lithium iron phosphate nano sheet is an [010] direction.

11. The lithium iron phosphate hierarchical structure of claim 1, wherein a material of overall spherical-shaped structure is doped lithium iron phosphate or undoped lithium iron phosphate.

12. A lithium ion battery comprising:
an anode electrode;
a cathode electrode comprising a cathode active material, the cathode active material comprising a lithium iron phosphate hierarchical structure having an overall spherical-shaped structure constructed by a plurality of lithium iron phosphate nano sheets layered together; and
a non-aqueous electrolyte disposed between the cathode electrode and the anode electrode;
wherein a plurality of clearances are defined between the plurality of lithium iron phosphate nano sheets, at an outer surface of the overall spherical-shaped structure; each of the plurality of clearances is in a range from about 1 nanometer to about 1 micron as measured at the outer surface of the overall spherical-shaped structure.

* * * * *